Patented Apr. 13, 1954

2,675,380

UNITED STATES PATENT OFFICE 2,675,380

NEW COLORING MATTERS

Richard James Fielden and Donald Graham Wilkinson, Blackley, Manchester, England, assignors to Imperial Chemical Industries Limited, a corporation of Great Britain No Drawing. Application February 11, 1952,
Serial No. 271,068

Claims priority, application Great Britain
February 20, 1951

6 Claims. (Cl. 260—243)

This invention relates to new colouring matters and more particularly to new dyestuffs containing a dithiazine structure.

According to our invention we provide new dyestuffs which in their free acid form are represented by the formula

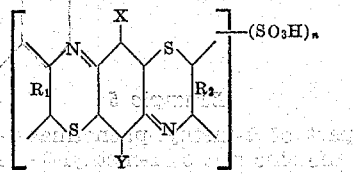

where X and Y represent hydrogen or halogen atoms or alkyl groups and $R_1$ and $R_2$ represent aromatic or heterocyclic radicals and $n$ represents a number greater than 0.

The new dyestuffs of our invention give fast shades on cotton and other cellulosic materials which are greener than those obtainable from the corresponding dyestuffs of the dioxazine series and they have the same high light fastness and brightness as the corresponding dioxazine direct dyestuffs.

According to a further feature of our invention we provide a process for the manufacture of new dyestuffs which comprises treating with sulphonating agents compounds of the formula

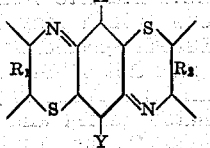

wherein X and Y represent hydrogen or halogen atoms or alkyl groups and $R_1$ and $R_2$ represent aromatic or heterocyclic radicals.

As sulphonating agents there may be used for example, concentrated sulphuric acid, oleum or chlorsulphonic acid.

The temperature and time required for the sulphonation of any particular compound of the formula indicated is readily determined by experiment. In general it is usually convenient to continue the sulphonation process until a sample of the reaction mixture is completely soluble in dilute sodium carbonate solution. The dyestuff may then be isolated by pouring the reaction mixture onto ice, filtering off the precipitated sulphate of the dyestuff and treating it with aqueous alkali to convert it to the sodium salt of the dyestuff. The dyestuff may then be salted out by adding, for example, common salt or sodium or potassium acetate.

The unsulphonated compounds are themselves new colouring matters. Some of these can be made by heating with sulphur the appropriate N:N'-diaryl-p-phenylene diamine, for example the N:N'-diphenyl-, di-β-naphthyl-, di-3-carbazyl- or di-1-pyrenyl-p-phenylene diamines.

Alternatively the unsulphonated compounds can be made by heating a phenothiazone with an o-aminothiophenol in an acid medium in the presence of an oxidising agent. For example by heating 7-methyl-phenothiaz-3-one with the zinc salt of 1-methyl-3-mercapto-4-aminobenzene in acetic acid in the presence of ferric chloride, 2:9-dimethyl-triphendithiazine is obtained.

The unsulphonated compounds wherein X and Y are halogen atoms may be made by heating a trihalogenophenothiazone with an o-aminophenol in an acidic medium. For example when 1:2:4-trichloro-7-anilino-9-methyl-phenothiaz-3-one is heated with 4-amino-3-mercapto-5-methyl-diphenylamine in benzoic acid there is obtained 2:9-dianilino-4:11-dimethyl-6:13-dichloro-triphendithiazine which has the formula

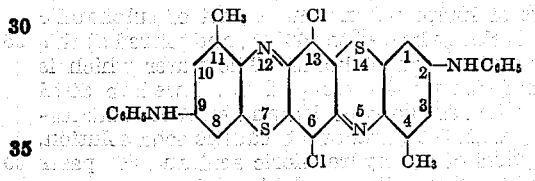

The invention is illustrated but not limited by the following examples in which the parts are by weight:

Example 1

52 parts of N:N'-diphenyl-p-phenylene diamine, 14.6 parts of sulphur and 0.15 part of iodine are heated together in a current of air to 180° C. and the mixture is maintained at this temperature for 4 hours. The reaction mixture is then cooled, ground up, stirred with 1000 parts of hot toluene and filtered. The residue on the filter is extracted continuously with boiling o-dichlorobenzene or pyridine from which on cooling, triphendithiazine separates as dark violet crystals with a brilliant metallic lustre. The crystals are filtered off, washed with a little benzene and dried at 100° C.

The product is treated with 10% oleum at 50° C. for 30 minutes and the reaction mixture is poured onto ice. The precipitated sulphate is filtered off, converted to the sodium salt with aqueous alkali and the dyestuff is salted out and filtered off. It dyes cotton in violet shades.

*Example 2*

18 parts of N:N'-di-β-naphthyl-p-phenylene diamine, 2.0 parts of sulphur, 0.1 part of iodine and 200 parts of kerosene (which has previously been heated with 5 parts of sulphur for 8 hours at 200° C.) are heated together at 200–210° C. for 16 hours while a slow current of air is passed through the reaction mixture. The suspension is cooled and filtered and the residue on the filter is washed with hot benzene and crystallised from nitrobenzene, when the product is isolated in the form of blue-violet bronzy needles which melt above 360° C.

The product is treated with 10% oleum at 60° C. for 4 hours and the reaction mixture is poured onto ice. The sulphate is filtered off and converted to the sodium salt with alkali, and the dyestuff is then salted out with salt and filtered off. It dyes cotton in blue shades.

*Example 3*

1 part of N:N'-di-(3-carbazyl)-p-phenylene diamine (prepared as described below), 1 part of sulphur and 10 parts of nitrobenzene are stirred and boiled under a reflux condenser for one hour. The suspension is then cooled and filtered and the residue on the filter is washed well with benzene. The product is continuously extracted with boiling chloronaphthalene from which the new compound separates on cooling in the form of needles with a high metallic lustre. The product is filtered off, washed with a little benzene and dried at 100° C.

When stirred in 10% oleum for 30 minutes the product gives a sulphonic acid derivative which can be isolated by diluting in water and filtering off the sulphate, converting this to the sodium salt and salting out the dyestuff. It dyes cotton in greenish-blue shades.

The N:N'-di-(3-carbazyl)-p-phenylene diamine used in the above example is prepared as follows:

A mixture of 25 parts of 3-amino-carbazole, 11 parts of hydroquinone and 1 part of sulphanilic acid is slowly heated to 240° C., and stirred at this temperature for 14 hours. The water which is formed during the reaction is allowed to distil off. The residue is cooled and extracted successively with 500 parts of 5% caustic soda solution, 500 parts of 5% hydrochloric acid and 500 parts of ethanol and the insoluble residue is recrystallised from aniline. The N:N'-di-(3-carbazyl)-p-phenylene diamine so obtained melts at 365° C.

*Example 4*

10 parts of N:N'-di-(1-pyrenyl)-p-phenylene diamine (prepared by heating 1-amino-pyrene and hydroquinone in the presence of sulphanilic acid), 10 parts of sulphur and 200 parts of nitrobenzene are stirred together and boiled under a reflux condenser for 2 hours. The dark coloured suspension so formed is cooled and filtered and the residue on the filter is washed with benzene and then extracted with chloronaphthalene in a continuous extractor. The chloronaphthalene extract is cooled and the dark blue-green microcrystalline precipitate which separates is filtered off, washed with a little benzene and dried at 100° C.

9 parts of the dipyrenyl derivative prepared as described above are slowly added to 100 parts of 10% oleum at room temperature. The reaction mixture is stirred at room temperature until a sample is completely soluble in dilute sodium carbonate solution. The reaction mixture is then poured onto 200 parts of ice and the suspension so obtained is filtered. The residue on the filter is washed with brine and then stirred with 500 parts of hot water. Soda ash is added gradually until the dyestuff dissolves. The solution is filtered off from a little insoluble matter and the dyestuff is salted out from the filtrate by adding potassium acetate. The precipitated dyestuff is filtered off, washed with ethanol and dried at 100° C. It dyes cotton in bright green shades of good affinity and high light fastness.

The new dyestuff is the salt of the sulphonic acid derivative of the dithiazine of the formula

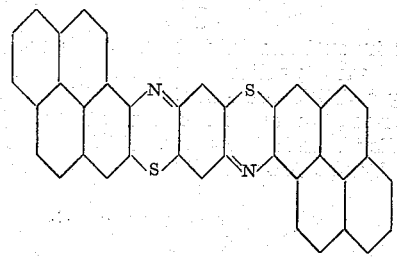

*Example 5*

0.25 part of 7-methyl-phenothiaz-3-one, 0.25 part of the zinc salt of 1-methyl-3-mercapto-4-aminobenzene, 7 parts of acetic acid and 0.1 part of ferric chloride are stirred together and boiled under a reflux condenser for 15 minutes. The reaction mixture is cooled and the dark violet product is filtered off, washed with ethanol, water and again with ethanol and dried. The product is recrystallised from pyridine, when 2:9-dimethyl-triphendithiazine is obtained in the form of short needles with a high metallic lustre. The product melts above 430° C. and gives bright blue solutions in sulphuric acid. The product is sulphonated by treating it with oleum and the sulphonated derivative thus obtained dyes cotton in red-violet shades.

*Example 6*

7 parts of 1:2:4-trichloro-7-anilino-9-methyl-phenothiaz-3-one (which may be prepared as described in British specification No. 265,641), 7 parts of the zinc salt of 4-amino-3-mercapto-5-methyl diphenylamine and 70 parts of benzoic acid are intimately mixed and the mixture is heated at 240–250° C., for 15 minutes. The reaction product is cooled and stirred with boiling 2% sodium carbonate solution. The suspension is filtered and the residue on the filter is washed well with hot water until it is free from benzoic acid. The dark blue-green powder so obtained is dried and extracted with pyridine in a continuous extractor. The pyridine solution is cooled and the dark-green crystals of 2:9-dianilino-4:11-dimethyl-6:13-dichloro-triphendithiazine which separate are filtered off, washed with a little ethanol and dried at 60° C. The product gives bluish-green solution in sulphuric acid. When the product is treated with oleum a sulphonated dyestuff is obtained which dyes cotton in green shades of good affinity.

Example 7

3 parts of N:N'-di-[2-(1':2')-benzcarbazyl]-p-phenylene diamine (prepared by heating 2-hydroxy-(1':2')-benzcarbazole with p-phenylene diamine in the presence of a trace of iodine), 0.6 part of sulphur and 200 parts of nitrobenzene are stirred and boiled under a reflux condenser with a slow stream of air bubbling into the liquor for 1½ hours. The dark greenish-blue suspension is cooled and filtered and the residue on the filter is washed with benzene and dried. The dithiazine is isolated by continuously extracting the residue with boiling nitrobenzene, cooling the nitrobenzene extracts and filtering when it is obtained in the form of intense dark blue needle crystals with a violet reflex. The dithiazine has the constitution

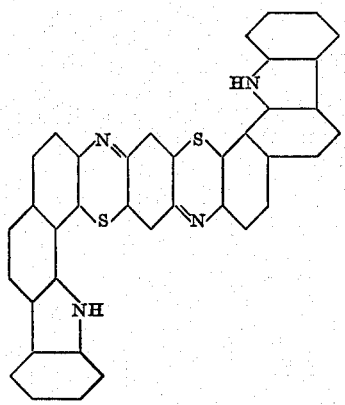

1 part of the dithiazine is added gradually with stirring to 30 parts of sulphuric acid at room temperature. The dark blue-green solution is stirred until a test sample is soluble in dilute aqueous ammonia. This takes between 1 and 2 hours. The solution is then poured onto a mixture of ice and water and the sulphonated dyestuff is filtered off. The dyestuff may be purified by dissolving it in sodium carbonate solution and salting out from solution. It forms a dark greenish-blue powder which dyes cotton in greenish-blue shades of good affinity.

Example 8

If, in the place of the 3 parts of N:N'-di-[2-(1':2')-benzcarbazyl]-p-phenylene diamine used in Example 7, there are used 3 parts of N:N'-di-[4-(3':4') - benzcarbazyl]-p-phenylene diamine (prepared by heating 4-hydroxy-(3':4')-benzcarbazole with p-phenylene diamine in the presence of a trace of iodine), a dithiazine is obtained which is greener than that of Example 7 and probably has the constitution

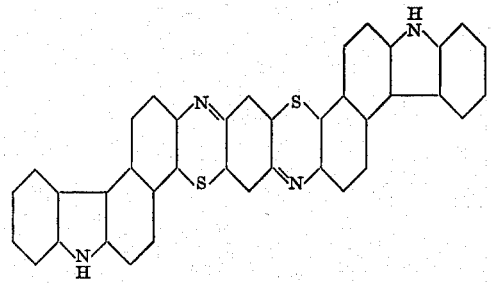

The dithiazine may be purified by continuously extracting with boiling nitrobenzene or chlornaphthalene, cooling the nitrobenzene extracts and filtering, when it is obtained as an almost black crystalline powder. 1 part of the dithiazine is stirred with 30 parts of 100% sulphuric acid until a test sample is soluble in dilute aqueous ammonium solution. This requires between 1 and 2 hours.

The dyestuff is isolated as described in Example 7. It dyes cotton in bright bluish-green shades of good fastness.

The 4-hydroxy-(3':4')-benzcarbazole is made from 6-methoxy-2-tetralone (Robinson and Weygand, Journal of the Chemical Society 1941, page 389; Cornforth, Cornforth and Robinson, Journal of the Chemical Society, 1942, page 689), by converting it to the corresponding phenyl hydrazone, boiling this with acetic acid to form 4-methoxy-1:2-dihydro-(3':4')-benzcarbazole, dehydrogenating with chloranil to form 4-methoxy-(3':4') - benzcarbazole and demethylating by heating with hydrobromic acid in acetic acid. The 4-hydroxy-(3':4')-benzcarbazole melts at 190–193° C.

What we claim is:

1. As new dyestuffs, the sulfonic acid derivatives of the formula:

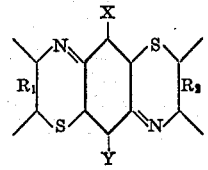

wherein X and Y are selected from the group consisting of hydrogen and halogen atoms, and $R_1$ and $R_2$ are radicals selected from the group consisting of mono- and di-cyclic carbocyclic radicals, pyreno, carbazolo and carbazolobenzo radicals.

2. A process for the manufacture of new dyestuffs which comprises treating with a sulfonating agent, a compound of the formula:

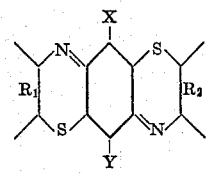

wherein X and Y are selected from the group consisting of hydrogen and halogen atoms, and $R_1$ and $R_2$ are radicals selected from the group consisting of mono- and di-cyclic carbocyclic radicals, pyreno, carbazolo and carbazolobenzo radicals.

3. As new dyestuffs, the sulfonic acid derivatives of the formula:

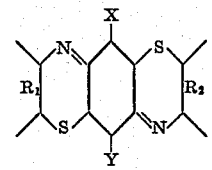

wherein X and Y represent hydrogen atoms and $R_1$ and $R_2$ represent pyrene nuclei.

4. As new dyestuffs, the sulfonic acid derivatives of the formula:

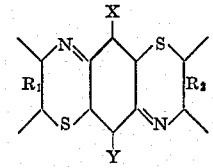

wherein X and Y represent hydrogen atoms and $R_1$ and $R_2$ represent 3:4-benzcarbazole nuclei.

5. A process for the manufacture of new dyestuffs which comprises treating with a sulfonating agent a compound of the formula:

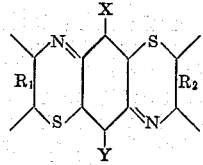

wherein X and Y represent hydrogen atoms and $R_1$ and $R_2$ represent pyrene nuclei.

6. A process for the manufacture of new dyestuffs which comprises treating with a sulfonating agent a compound of the formula:

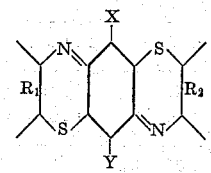

wherein X and Y represent hydrogen atoms and $R_1$ and $R_2$ represent 3:4-benzcarbazole nuclei.

No references cited.